(12) United States Patent
Berube et al.

(10) Patent No.: US 11,613,348 B2
(45) Date of Patent: Mar. 28, 2023

(54) AIRCRAFT ENGINE WITH CLUTCH AND MECHANICAL LOCK

(71) Applicant: PRATT & WHITNEY CANADA CORP., Longueuil (CA)

(72) Inventors: Stephane Berube, St-Philippe (CA); Bruno Villeneuve, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/644,101

(22) Filed: Dec. 14, 2021

(65) Prior Publication Data
US 2022/0106032 A1 Apr. 7, 2022

Related U.S. Application Data

(62) Division of application No. 16/173,209, filed on Oct. 29, 2018, now Pat. No. 11,267,563.

(51) Int. Cl.
*B64C 27/12* (2006.01)
*F16D 1/108* (2006.01)
(Continued)

(52) U.S. Cl.
CPC ............ *B64C 27/12* (2013.01); *F01C 11/008* (2013.01); *F02C 6/206* (2013.01); *F16D 1/108* (2013.01); *F16D 55/02* (2013.01); *F16H 1/28* (2013.01)

(58) Field of Classification Search
CPC ......... B60K 17/26; B60T 1/005; B60T 1/062; B64C 27/12; B64C 27/14; B64D 41/00;
(Continued)

(56) References Cited

U.S. PATENT DOCUMENTS 3,748,927 A * 7/1973 Hertzog .................. F16H 37/00
475/8
3,977,812 A 8/1976 Hudgins
(Continued)

FOREIGN PATENT DOCUMENTS

EP 3321494 A1 5/2018
WO 20090093395 A1 7/2009

OTHER PUBLICATIONS

European Search Report issued in counterpart application 21200950.0 dated Feb. 4, 2022.

*Primary Examiner* — Jesse S Bogue
(74) *Attorney, Agent, or Firm* — Norton Rose Fulbright Canada LLP (57) ABSTRACT

There is disclosed an aircraft engine assembly including an engine having an engine shaft; an output shaft; a clutch in driving engagement between the engine shaft and the output shaft. The clutch has a first component in driving engagement with the engine shaft and a second component. The clutch is operable between first and second configurations. In the first configuration, the first component is rotatable relative to the second component and the engine shaft is rotatable relative to the output shaft. In the second configuration, the first and second components are engaged with one another and the engine shaft rotates with the output shaft. A mechanical lock is operable between first and second positions. In the first position, the mechanical lock is disengaged from the first component. In the second position, the first and second components are secured for joint rotation one relative to the other.

5 Claims, 4 Drawing Sheets

(51) Int. Cl.
*F16D 55/02* (2006.01)
*F16H 1/28* (2006.01)
*F02C 6/20* (2006.01)
*F01C 11/00* (2006.01)

(58) Field of Classification Search
CPC ........ F01C 11/008; F02C 6/206; F16D 1/108;
F16D 11/10; F16D 55/02; F16D 63/006;
F16D 65/183; F16H 1/28
See application file for complete search history.

(56) References Cited

U.S. PATENT DOCUMENTS

| | | | |
|---|---|---|---|
| 3,994,375 A * | 11/1976 | Stritzel | B60T 1/062 |
| | | | 188/73.31 |
| 4,546,865 A | 10/1985 | Hodgman et al. | |
| 4,651,521 A | 3/1987 | Ossi | |
| 4,790,212 A | 12/1988 | Sibeud | |
| 4,796,737 A | 1/1989 | Tyler | |
| 4,862,009 A | 8/1989 | King | |
| 5,028,803 A | 7/1991 | Reynolds | |
| 5,676,229 A * | 10/1997 | Bates | F16D 48/066 |
| | | | 192/109 R |
| 10,113,482 B2 | 10/2018 | Poulin | |
| 10,364,872 B2 | 7/2019 | Keeney et al. | |
| 10,858,119 B2 | 12/2020 | Hefner et al. | |
| 2005/0151001 A1 | 7/2005 | Loper | |
| 2008/0167782 A1* | 7/2008 | Belmont | B60T 1/062 |
| | | | 475/5 |
| 2009/0113871 A1 | 5/2009 | Certain | |
| 2012/0302392 A1* | 11/2012 | Liu | F16H 57/082 |
| | | | 475/331 |
| 2013/0085031 A1* | 4/2013 | Bassi | B60K 17/36 |
| | | | 475/220 |
| 2014/0373521 A1* | 12/2014 | DeVita | B64D 35/00 |
| | | | 60/347 |
| 2015/0176486 A1 | 6/2015 | Menheere et al. | |
| 2015/0266375 A1* | 9/2015 | Tavvala | B60K 17/36 |
| | | | 180/24.09 |
| 2016/0280066 A1* | 9/2016 | Tavvala | B60K 17/36 |
| 2016/0376981 A1 | 12/2016 | Ullyott et al. | |
| 2017/0253331 A1 | 9/2017 | Nakashima | |
| 2018/0135512 A1 | 5/2018 | Poulin | |
| 2020/0124168 A1 | 4/2020 | Ohlig et al. | |

* cited by examiner

AIRCRAFT ENGINE WITH CLUTCH AND MECHANICAL LOCK

CROSS-REFERENCE TO RELATED APPLICATIONS

This application is a divisional of U.S. application Ser. No. 16/173,209 filed Oct. 29, 2018, the entire content of which is incorporated by reference herein.

TECHNICAL FIELD

The application relates generally to aircraft engines and, more particularly, to systems and methods for engaging the engines to rotatable loads.

BACKGROUND OF THE ART

In a helicopter, a clutch between an engine shaft and the helicopter rotor allows an engine to be used for other purposes than for rotating the helicopter rotor.

The conventional mechanical solution is to install an engagement device, such as a friction mechanism (e.g., like a disc(s) clutch or belt clutch) or a hydraulic coupling, to progressively engage the rotor. Such engagement devices need to be sized to transmit the maximum torque, which results in voluminous and heavy components. There is therefore a need for improvements.

SUMMARY

In one aspect, there is provided an aircraft engine assembly comprising: an engine having an engine shaft; an output shaft; a clutch in driving engagement between the engine shaft and the output shaft, the clutch having a first component in driving engagement with the engine shaft and a second component, the clutch operable between a first configuration and a second configuration, in the first configuration the first component is rotatable relative to the second component and the engine shaft is rotatable relative to the output shaft, in the second configuration the first and second components are engaged with one another such that rotation of the first component relative to the second component is limited and the engine shaft rotates with the output shaft, the clutch configured to selectively engage the engine shaft to the output shaft via the engagement between the first component and the second component; a mechanical lock operable between a first position and a second position, in the first position the mechanical lock is disengaged from the first component of the clutch, and in the second position the first component and the second component of the clutch are secured for joint rotation one relative to the other.

In another aspect, there is provided an aircraft engine comprising: an intermittent internal combustion engine having an engine shaft; a turbine having a turbine shaft drivingly engaged to the engine shaft, the turbine having a turbine inlet fluidly connected to an exhaust of the intermittent internal combustion engine; an output shaft operatively connectable to a rotatable load; a clutch in driving engagement between the engine shaft and the output shaft, the clutch having a first component in driving engagement with the engine shaft and a second component, the clutch operable between a first configuration and a second configuration, in the first configuration the first component is rotatable relative to the second component and the engine shaft is rotatable relative to the output shaft, in the second configuration the first and second components are engaged with one another such that rotation of the first component relative to the second component is limited and the engine shaft rotates with the output shaft, the clutch configured to selectively engage the engine shaft to the output shaft via the engagement between the first component and the second component; a mechanical lock operable between a first position and a second position, in the first position the mechanical lock is disengaged from the first component of the clutch, and in the second position the first component and the second component of the clutch are secured for joint rotation one relative to the other.

In yet another aspect, there is provided a method of operating an aircraft engine comprising: rotating an engine shaft of an engine; starting rotation of a rotatable load by progressively increasing a magnitude of a torque transmitted from the engine shaft to an output shaft in driving engagement with the rotatable load; when the rotatable load reaches a given rotational speed, locking the output shaft to the engine shaft; and increasing a rotational speed of the rotatable load beyond the given rotational speed.

DESCRIPTION OF THE DRAWINGS

Reference is now made to the accompanying figures in which.

DETAILED DESCRIPTION

Figure 1:
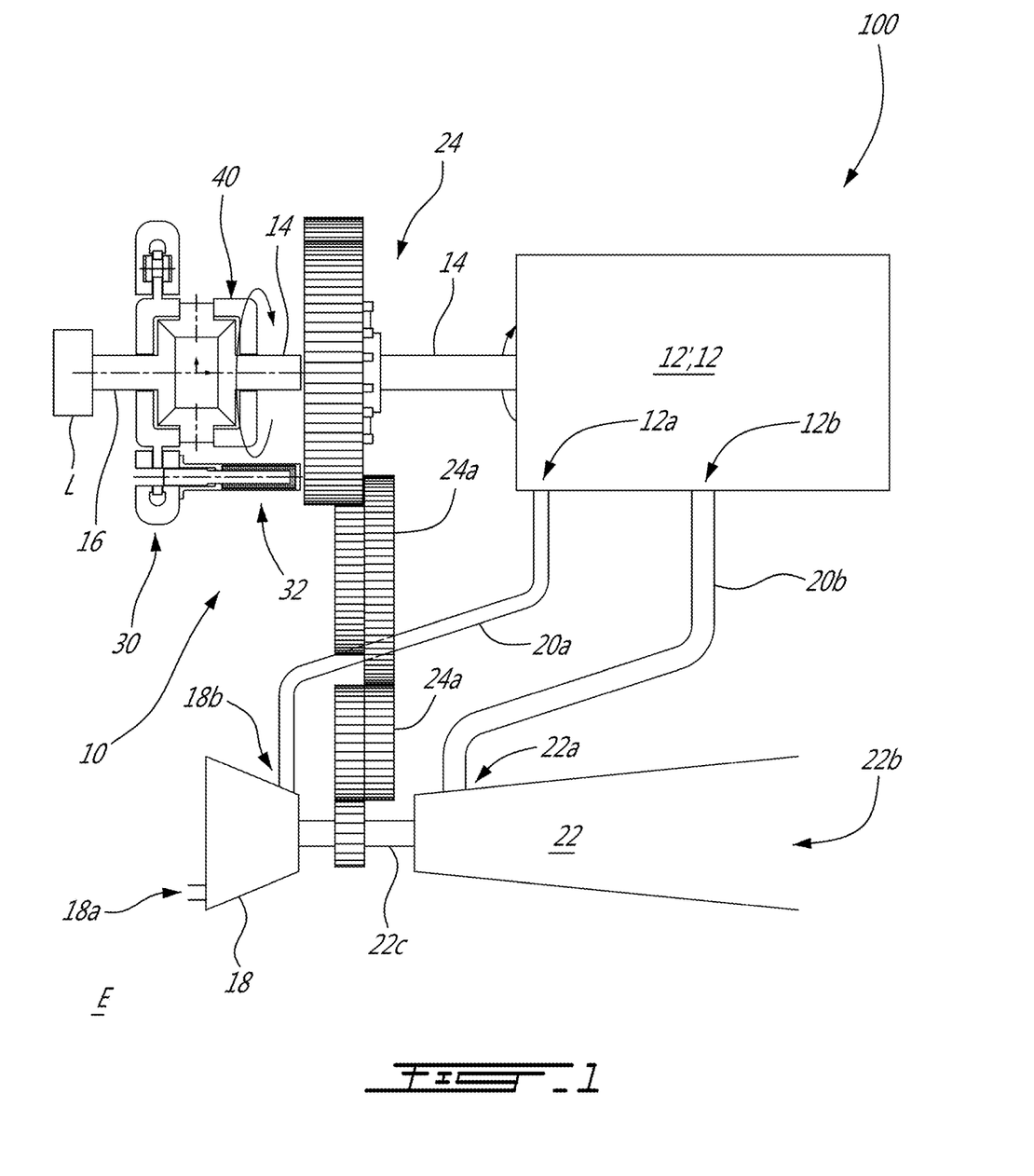
FIG. 1 is a schematic view of an aircraft engine in accordance with one embodiment.

Referring to FIG. 1, an aircraft engine 10 is generally shown and includes an engine 12', which may be any type of suitable engines, such as an intermittent internal combustion engine, a gas turbine engine, an electric engine and so on. In a particular embodiment, the engine 12' is an internal combustion engine 12 that comprises one or more rotary units each configured for example as a Wankel engine, or one or more reciprocating pistons. The internal combustion engine 12 drives an engine shaft 14 that is used for driving a rotatable load L that is secured to an output shaft 16 of the aircraft engine 10. It is understood that the aircraft engine 10 may alternately be configured to drive any other appropriate type of load, including, but not limited to, one or more generator(s), propeller(s), accessory(ies), rotor mast(s), compressor(s), or any other appropriate type of load or combination thereof. The rotatable load L may be a helicopter rotor. The aircraft engine 10 may be used as a prime mover engine, such as on an aircraft or other vehicle, or in any other suitable application.

In a particular embodiment, the internal combustion engine 12 is a rotary engine comprising three rotary units each configured as a Wankel engine, with a rotor cavity having a profile defining two lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume. Alternatively, the internal combustion engine 12 may be any type of intermittent internal combustion engine such as a piston engine. Alternatively, the internal combustion engine may be replaced by any other suitable type of engine such as, an electrical motor.

In the embodiment shown, the internal combustion engine 12 is a component of a turbo-compounded engine 100 of the aircraft engine 10; the turbo-compounded engine 100 including a compressor 18 for compressing the air before it is fed to an air inlet 12a of the internal combustion engine 12. As illustrated, the compressor 18 has an inlet 18a fluidly connected to an environment E outside of the aircraft engine 10 and an outlet 18b fluidly connected via a conduit 20a to the inlet 12a of the internal combustion engine 12 for feeding compressed air to the internal combustion engine 12.

In a particular embodiment, the turbo-compounded engine 100 may be as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein.

As illustrated, the turbo-compounded engine 100 includes a turbine 22 receiving the exhaust gases from the internal combustion engine 12. The turbine 22 has an inlet 22a fluidly connected via a conduit 20b to an exhaust 12b of the internal combustion engine 12. The turbine 22 has an outlet 22b fluidly connected to the environment E for expelling exhaust gases generated by the internal combustion engine 12 and after their passage in the turbine 22.

In the case of a rotary engine, the internal combustion engine 12 provides an exhaust flow of high pressure hot gas exiting at high peak velocity, in the form of exhaust pulses. The turbine 22 may comprise a single turbine, or two or more turbine stages in serial fluid communication; the two or more turbine stages may have different reaction ratios from one another and might be configured to cater to the exhaust pulses of the internal combustion engine. Other configurations are contemplated.

It is understood that variations are possible, and that, for example, the compressor and/or turbine may be omitted without departing from the scope of the present disclosure.

In the illustrated embodiment, the compressor 18 and the turbine 22 are in a driving engagement with a gearbox 24. In the illustrated embodiment, the compressor 18 and the turbine 22 are engaged to a same turbine shaft 22c, which is drivingly engaged to the engine shaft 14 through the gearbox 24; the turbine shaft 22c and the engine shaft 14 are parallel and radially offset from one another. Alternate configurations are possible, including, but not limited to, the rotor(s) of the compressor 18 being engaged to a shaft separate from the turbine shaft 22c (whether coaxial with the turbine shaft 22c, with the engine shaft 14, or offset from both) and in driving engagement with the turbine shaft 22c and/or the engine shaft 14, for example through the gearbox 24; and/or two or more of the shafts extending at an angle (perpendicularly or otherwise) to each other.

In the depicted embodiment, energy from the exhaust gases exiting the internal combustion engine 12 is extracted by the turbine 22; the energy extracted by the turbine 22 being compounded with the internal combustion engine 12 to drive the engine shaft 14 via the gearbox 24.

As shown in FIG. 1, the gearbox 24 includes a plurality of gears 24a meshed with one another to transfer a rotation input between the turbine shaft 22c and the engine shaft 14. The gearbox 24 may create a rotational speed ratio between a rotational speed of the engine shaft 14 and that of the turbine shaft 22c. In other words, the gearbox 24 may increase or decrease a torque transmitted from the turbine shaft 22c to the engine shaft 14.

In some cases, it might be desired to have the internal combustion engine 12 running without having the rotatable load L (e.g., helicopter rotor) rotating. This type of configuration is referred to herein below as a hotel operation mode as opposed to a normal operation mode in which both the engine shaft 14 and the output shaft 16, and thus the rotatable load L, are in rotation.

Conventional systems such as friction clutches, may be used to bring the engine shaft 14 in driving engagement with the output shaft 16. However, such clutches need to be able to withstand a maximum torque generated by the internal combustion engine 12. For a flying vehicle, weight is always as concern. Consequently, using a conventional clutch able to withstand the maximum torque of the internal combustion engine 12 might be detrimental to the performance of the vehicle. Direct clutches, such as dog clutches, might be used. Their weights is typically less than that of conventional friction clutches for a same value of a maximum transmittable torque. However, the rotational speeds of the engine shaft 14 and that of the output shaft 16 must be equivalent prior to actuating the dog clutch to avoid damaging the system.

In the depicted embodiment, the aircraft engine 10 further includes a brake, also referred to as a clutch, 30 for selectively engaging the engine shaft 14 to the output shaft 16 and that is used for initiating rotation of the rotatable load L. The clutch 30 includes a first component 30', which is in driving engagement with the engine shaft 14, and a second component 30". The clutch 30 is operable between a first configuration and a second configuration. The engine shaft 14 rotates independently from the output shaft 16 in the first configuration. Stated otherwise, the engine shaft 14 is drivingly disengaged from the output shaft 16 in the first configuration of the clutch 30. The engine shaft 14 transmits a torque to the output shaft 16 via the clutch 30 in the second configuration of the clutch 30. The clutch 30 is operable to gradually increase a force transmitted from the engine shaft 14 and the output shaft 16 such that a magnitude of the torque transmittable from the engine shaft 14 to the output shaft 16 gradually increases from the first configuration to the second configuration. More specifically, in the first configuration of the clutch 30, the first component 30' is rotatable relative to the second component 30" and the engine shaft 14 is rotatable relative to the output shaft 16. In the second configuration of the clutch 30, the first and second components 30', 30" are engaged with one another such that rotation of the first component 30' relative to the second component 30" is limited and the engine shaft 14 rotates with the output shaft 16. The clutch is configured to selectively engage the engine shaft 14 to the output shaft 16 via the engagement between the first component 30' and the second component 30".

The clutch 30 is sized to be able to transmit a torque that corresponds to at least a minimal torque causing a rotational acceleration of the rotatable load L. In a particular embodiment, the clutch 30 is able to transmit a torque that corresponds to at least a torque able to increase a rotational speed of the output shaft 16 from rest to a given rotational speed.

The aircraft engine 10 further includes a mechanical lock 32 that is able to lock the engine shaft 14 with the output shaft 16 such that the engine shaft 14 is rotatably locked to the output shaft 16. When the engine shaft 14 is rotatably locked to the output shaft 16, the output shaft 16 and the engine shaft 14 are in joint rotation. The mechanical lock 32 is operable between a first position in which the engine shaft 14 is rotatable relative to the output shaft 16 and a second position in which the engine shaft 14 is rotatably locked to the output shaft 16 as described herein above. The engine shaft 14 and the output shaft 16 are in joint rotation in the second position of the mechanical lock 32. More specifically, in the first position, the mechanical lock is disengaged from the first component 30' of the clutch 30. In the second position, the first component 30' and the second component 30" of the clutch 30 are secured for joint rotation one relative to the other.

Herein, the expression "joint rotation" means that, rotation of a first element causes, or is caused by, rotation of a second element, whether or not they rotate at a same rotational speed. For instance, if the first element is secured to a first gear and the second element is secured to a second gear meshed with the first gear, rotation of the first element induces rotation of the second element and vice versa. The first and second gears may have different numbers of teeth such that a rotational speed ratio would be created between the first and second elements. However, herein, the first and second elements would be consider to be in joint rotation regardless of their variation in rotational speeds.

In the embodiment shown, the mechanical lock 32 and the clutch 30 are parts of an engagement device 40. A plurality of embodiments of the engagement device are possible, three are described in detail herein below with reference to FIGS. 1 to 5.

Figure 2:
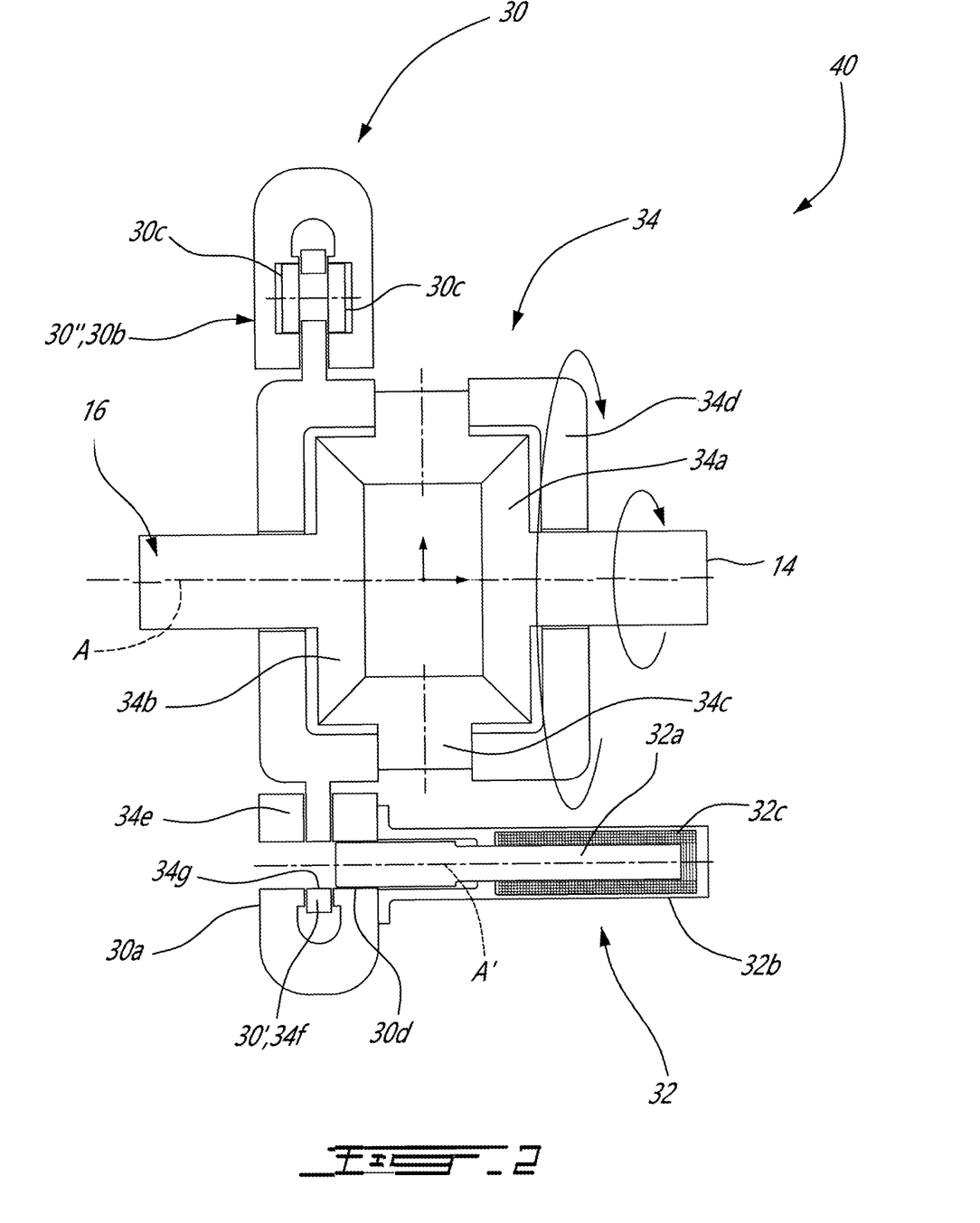
FIG. 2 is a schematic view of an engagement device of the aircraft engine of FIG. 1 in accordance with one embodiment.

Referring to FIGS. 1-2, the engagement device 40 further includes a gear train 34 that includes a driver sun gear 34a in driving engagement with the engine shaft 14, a driven sun gear 34b in driving engagement with the output shaft 16, planet gears 34c meshed with both of the driver sun gear 34a and the driven sun gear 34b, and a planet carrier 34d that rotatably supports the planet gears 34c.

In the first configuration of the clutch 30, rotation of the driver sun gear 34a induces rotation of the planet gears 34c that are meshed therewith and, because of the rotational inertia of the rotatable load L, the driven sun gear 34b remain substantially immobile. As a result, the planet carrier 34d rotates about an axis of rotation A that is coincident with that of the driver sun gear 34a.

To induce rotation of the driven sun gear 34b, and thus of the output shaft 16, rotation of the planet carrier 34d has to be limited. In the depicted embodiment, the clutch 30 is used to limit rotation of the planet carrier 34d. More specifically, and as more clearly seen in FIG. 2, the planet carrier 34d defines a surface 34e on which friction may be applied to decrease a rotational speed of the planet carrier 34d and, consequently, increase that of the driven sun gear 34b. In the embodiment shown, the surface 34e belongs to a disk 34f located on an external periphery of the planet carrier 34d; the disk 34f circumferentially extending all around the axis A. In this embodiment, the disk 34f corresponds to the first component 30' of the clutch 30.

The clutch 30 includes a housing 30a that is secured to the aircraft such that the housing 30a is immobile. The housing 30a encloses a braking member 30b, which, in the depicted embodiment, corresponds to brake pads 30c, two in the embodiment shown that face each other and that receive the disk 34f therebetween. The braking member 30b is operable between a free configuration in which the disk 34f and the braking member 30b are rotatable relative to one another, and a braking configuration in which the braking member 30b limits rotation of the disk 34f. The braking member 30b may be any suitable device operable to exert a force on the disk. In this embodiment, the braking member 30b corresponds to the second component 30" of the clutch 30.

The brake pads 30c are movable within the housing 30a to be selectively in contact with the surface 34e of the disk 34f or distanced therefrom. In the second configuration of the clutch 30, the brake pads 30c exert a frictional force on the planet carrier 34d via the disk 34f when they are in contact with the surface 34e. The brake pads 30c are engaged by any suitable actuator known in the art (e.g., hydraulic, solenoid, etc).

At some point, the planet carrier 34d stops rotating. However, an increase of the rotational speed and torque of the engine shaft 14, and thus of the driver sun gear 34a, might cause the clutch 30 to "slip" and the planet carrier 34d to rotate relative to the brake pads 30c because the clutch 30 is only able to withstand a maximum torque that is less than a maximum torque of the engine 12. In other words, an acceleration of the engine shaft 14 might not translate in an acceleration of the output shaft 16 because the clutch 30 is not configured to withstand a torque beyond a given threshold. Consequently, when the planet carrier 34d stops rotating, the planet carrier 34d is locked with the mechanical lock 32 such that it remains substantially immobile regardless of the rotational speed and torque of the engine shaft 14.

Still referring to FIG. 2, the mechanical lock 32 is shown enlarged. As illustrated the housing 30a and the disk 34f of the planet carrier 34d both define a plurality of apertures 30d, 34g circumferentially distributed along their circumference; the apertures 34g of the disk 34f being registerable with the apertures 30d of the housing 30c. The mechanical lock 32 includes a rod 32a that is movable within a casing 32b secured to the housing 30a of the clutch 30; the rod 32a being slidably receivable within the apertures 30d, 34g of both of the housing 30a and the disk 34f.

When the planet carrier 34d stops rotating, the rod 32a is moved along its longitudinal axis A' through one of the apertures 30d of the housing 30 and through one of the apertures 34g of the disk 34f to prevent any further rotation of the planet carrier 34d relative to the housing 30a. In the embodiment shown, an actuator 32c is used to move the rod 32a. The actuator 32c may be any suitable type of actuator such as a solenoid, a hydraulic actuator, etc. In a particular embodiment, energy must be provided to the actuator 32c to move the rod out of the apertures 30d, 34g of the housing 30a and of the disk 34f from the second position to the first position. This might prevent the engine shaft 14 from becoming drivingly disengaged from the rotatable load L, which may be a helicopter rotor, when the helicopter is flying and an energy source becomes erroneously disconnected from the actuator 32c or if the actuator fails. In the embodiment shown, the rod 32a is biased with a biasing member, such as a spring, in the apertures 30d, 34g and energy must be provided to the actuator 32c to overcome a force generated by the biasing member.

Figure 3:
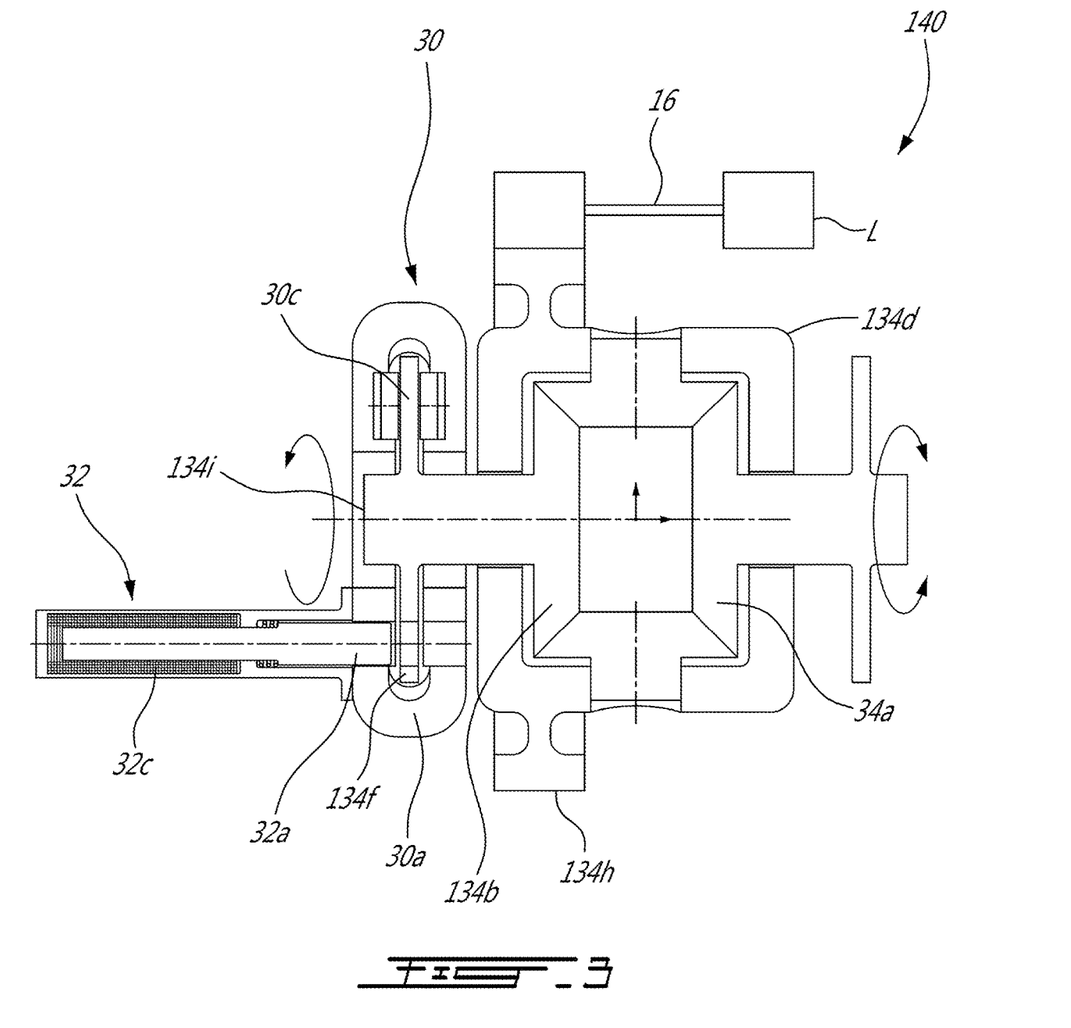
FIG. 3 is a schematic view of an engagement device in accordance with another embodiment and that may be used with the aircraft engine of FIG. 1
Figure 4:
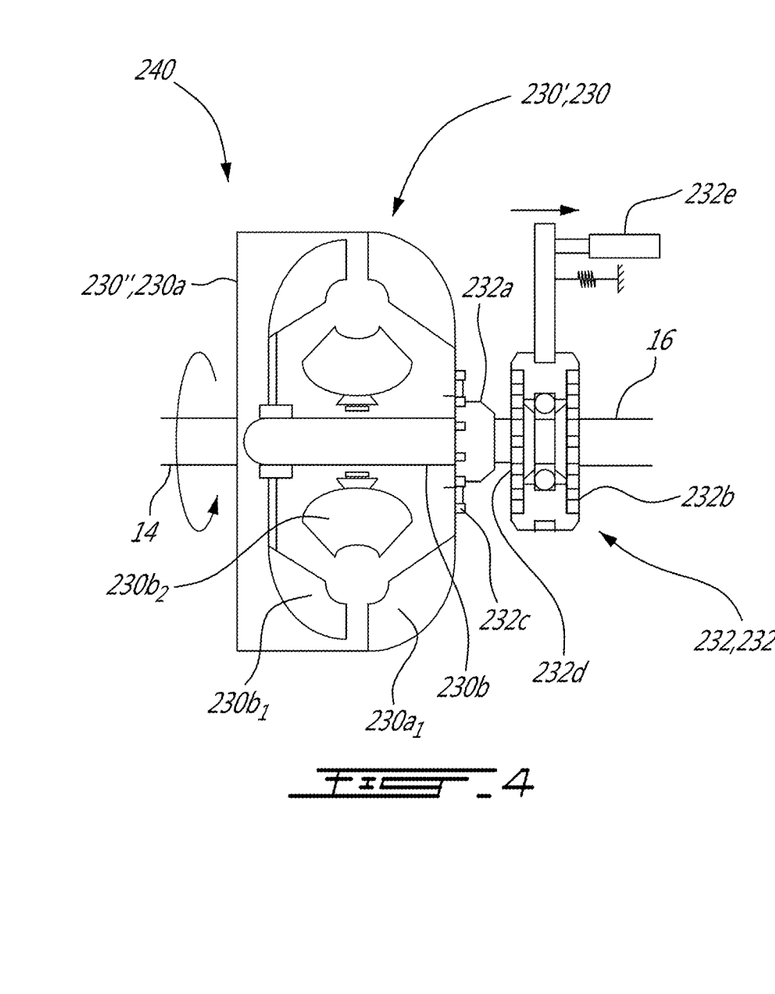
FIG. 4 is a schematic view of an engagement device, shown in a hotel operation mode, in accordance with yet another embodiment that may be used with the aircraft engine FIG. 1.

Referring now to FIG. 3, another embodiment of the engagement device is shown at 140. For the sake of clarity, reference numerals in common to both engagement devices 40, 140 of FIG. 3 and FIG. 4 are not reproduced on FIG. 4 as the engagement device 140 is similar to the engagement device 40 described above with reference to FIG. 3. However, the rotatable load L is in driving engagement with the planet carrier 134d instead of with the driven sun gear 134b. More specifically, a gear 134h is secured to the planet carrier 134d; the gear 134h being in driving engagement with the output shaft 16. The gear 134h may be monolithic with the planet carrier 134d.

In the depicted embodiment, as the rotatable load L is in driving engagement with the planet carrier 134d, rotation of the driver sun gear 34a translates in rotation of the driven sun gear 134b because there is more inertia to overcome on the planet carrier 134d than on the driven sun gear 134b. To start rotation of the planet carrier 134d, and of the rotatable load L, rotation of the driven sun gear 134b has to be limited.

For that purpose, the clutch 30 is operatively connected to the driven sun gear 134b. In the embodiment shown, the driven sun gear 134b is secured to a truncated shaft 134i. The disk 134f circumferentially extends all around, and is secured to, the truncated shaft 134i. The housing 30a of the clutch 30, the brake pads 30c, and the mechanical lock 32 are as described with reference to FIG. 3. The difference being that the disk 134f is secured to the truncated shaft 134i instead of to the planet carrier 134d.

In the embodiment depicted in FIG. 4, a rotational ratio is provided via the gear train 34 between the driver sun gear 34a and the planet carrier 134d. In a particular embodiment, a rotational speed ratio corresponding to a rotation speed of the driver sun gear 34a over that of the planet carrier 134d is two. Other ratios may be obtained by varying teeth count of the gears of the gear train 34 as known in the art.

Figure 5:
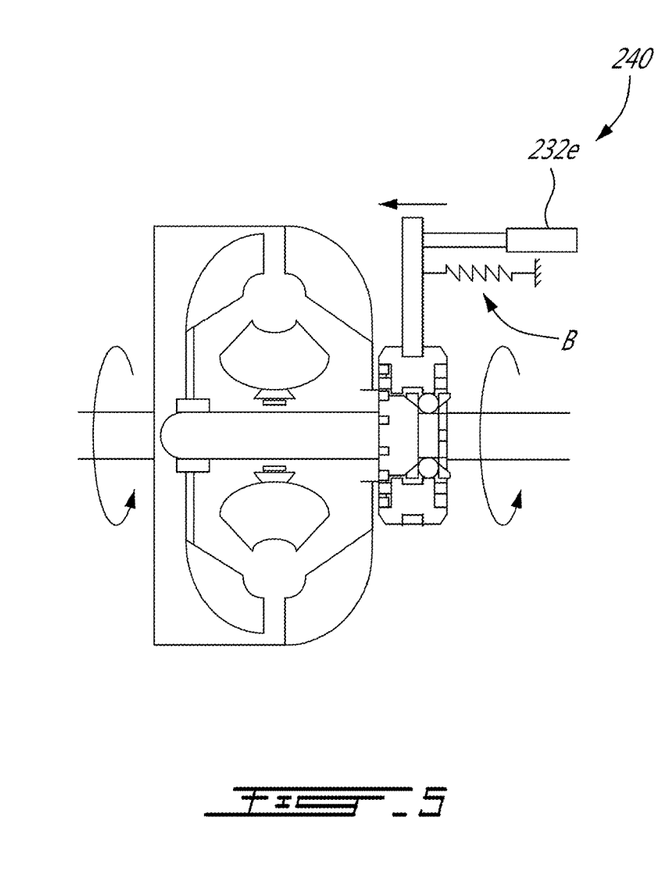
FIG. 5 is a schematic view of the engagement device of FIG. 4 shown in a normal operation mode.

Referring now to FIGS. 4-5, another embodiment of an engaging device is generally shown at 240. The engaging device 240 includes a clutch 230' provided in the form of a torque converter 230 operatively coupled between the engine shaft 14 and the output shaft 16. The torque converter 230 includes an input 230a in driving engagement with the engine shaft 14 and an output 230b in driving engagement with the output shaft 16. The input 230a is drivingly engageable to the output 230b via a fluid contained in the torque converter 230. The torque converter 230 may be any torque converter known in the art. In the depicted embodiment, the torque converter 230 includes a pump or impeller 230ai, which may be a part of the input 230a; a turbine 230b1, which may be a part of the output 230b; and a stator 230b2, which may be a part of the output 230b. The stator 230b2 is configured for redirecting the fluid exiting the turbine 230b1 toward an inlet of the impeller 230ai with an appropriate incidence angle. In a particular embodiment, there is no fluid in the torque converter 230 in the first configuration of the clutch 230' such that the input 230a and the output 230b of the torque converter 230 are rotatable one relative to the other. In the second configuration of the clutch 230', fluid is present in the torque converter 230 such that a torque is transmittable via the fluid from the input 230a to the output 230b of the torque converter 230.

In the depicted embodiment, a first component 230" of the clutch 230' corresponds to the input 230a of the torque converter 230 and the second component 230''' of the clutch 230' is engaged to the output 230b of the torque converter 230. More specifically, the second component 230''' of the clutch 230' corresponds to the turbine 230b1 of the torque converter 230; the turbine 230b1 of the torque converter 230 being engaged to the output shaft 16.

The torque converter 230 transmits a torque from the engine shaft 14 to the output shaft 16 via a cooperation of the input 230a and the output 230b. At some point, the rotational speed of the engine shaft 14 corresponds to that of the output shaft 16 and the engine shaft 14 may be locked with the output 16 shaft via the mechanical lock 232'.

In the present embodiment, the mechanical lock 232' is a dog clutch 232 having a first part 232a in driving engagement with the input 230a of the torque converter 230 and a second part 232b in driving engagement with the output shaft 16. As illustrated on FIG. 5, one of the first part and the second part 232a, 232b has male members 232c, such as pins, and the other of the first part and the second part 232a, 232b has female members 232d, such as apertures correspondingly shaped to receive the male members 232c in the second position (FIG. 5) of the mechanical lock 232'. An actuator 232e, that may be any kind of actuators described above, is used to move the first and second parts 232a, 232b toward each other to mate the male members 232c with the female members 232d when the engine shaft 14 rotates at substantially the same speed than that of the output shaft 16.

The first and second parts 232a, 232b of the dog clutch 232 may be biased in a position where they are engaged with one another. A biasing member B, such as a spring, may exert a force on at least one of the first and second parts 232a, 232b to maintain them engaged up to a point where energy is provided to the actuator 232e to move the first and second parts 232a, 232b away from each other to disengage them.

In a particular embodiment, the torque converter 230 may be replaced by a magnetic clutch. In a particular embodiment, the clutch 30 described with reference to FIGS. 1-4 may use a magnetic field to transmit the torque rather than friction. Other configurations are contemplated without departing from the scope of the present disclosure. Any combinations of the above described clutches 30, 230' and mechanical locks 32, 232 may be used without departing from the scope of the present disclosure.

In a particular embodiment, the combination of the clutch and the mechanical lock allows to start rotation of the rotatable load while having the internal combustion engine already in operation. The overall weight of the disclosed aircraft engine is less than that of a configuration in which only a clutch sized to withstand the maximal torque of the internal combustion engine is used for equal power.

In a particular embodiment, the power required to accelerate the rotatable load from rest to idle remains small if a sufficient period of time is allowed for accelerating the rotatable load. In a particular embodiment, the period of time varies from 15 to 30 seconds. In a particular embodiment, initial calculations shows that power for engaging the rotatable load via the drive train 34 can be a small fraction of the internal combustion engine 12 nominal output and may be below 10% of the engine nominal output. This might allow for the reduction of the volume and weight of the clutch. In a particular embodiment, the addition of mechanical lock adds a little weight, but can still be controlled within acceptable limits, since simple feature like sliding pins, dogs or splines can take heavy loads in small and light packages. In a particular embodiment, the progressive engagement and lock can be achieved with non-rotating components, keeping simplicity and improving the reliability and maintainability of the system.

To operate the aircraft engine 10, the engine shaft 14 is rotated. Rotation of the rotatable load L is started by progressively increasing a magnitude of a torque transmitted from the engine shaft 14 to the output shaft 16 in driving engagement with the rotatable load L. When the rotatable load L reaches a given rotational speed, the output shaft 16 is locked to the engine shaft 14 such that the output shaft 16 and the engine shaft 14 are in joint rotation. At that point, the rotational speed of the rotatable load L is increased beyond the given rotational speed.

In the depicted embodiment, starting rotation of the rotatable load L includes: rotating the driver sun gear 34*a* thereby rotating one of the driven sun gear 34*b* and the planet carrier 34*d* rotatably supporting the planet gears 34*c*; the output shaft 16 being in driving engagement with the other of the driven sun gear 34*b* and the planet carrier 34*d*. And, rotation of the one of the driven sun gear 34*b* and the planet carrier 34*d* is decelerated such that rotation of the other of the driven sun gear 34*b* and the planet carrier 34*d* is accelerated.

As illustrated on FIGS. 3 and 4, decelerating the one of the driven sun gear 34*b* and the planet carrier 34*d* includes exerting a force on the one of the driven sun gear 34*b* and the planet carrier 34*d*. In the embodiment shown, the force on the one of the driven sun gear 34*b* and the planet carrier 34*d* is a friction force exerted on a surface 34*e* of the one of the driven sun gear 34*b* and the planet carrier 34*d*.

In the embodiment shown, locking the output shaft 16 to the engine shaft 14 includes operating the mechanical lock 32 from the first position in which the engine shaft 14 is rotatable relative to the output shaft 16 to the second position in which the engine shaft 14 is rotatably locked to the output shaft 16. The engine shaft 14 and the output shaft 16 are in joint rotation with each other in the second position of the mechanical lock 32. As shown, operating the mechanical lock 32 includes moving the rod 32*a* with the actuator 32*c* engaged to the rod 32*a*.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of operating an aircraft engine comprising:
rotating an engine shaft of the aircraft engine;
starting rotation of a rotatable load by progressively increasing a magnitude of a torque transmitted from the engine shaft to an output shaft in driving engagement with the rotatable load, wherein starting rotation of the rotatable load includes:
rotating a driver sun gear in driving engagement with the engine shaft thereby rotating one of a driven sun gear and a planet carrier rotatably supporting planet gears meshed with the driving sun gear and the driven sun gear, the output shaft in driving engagement with the other of the driven sun gear and the planet carrier; and
decelerating rotation of the one of the driven sun gear and the planet carrier thereby accelerating rotation of the other of the driven sun gear and the planet carrier;
when the rotatable load reaches a given rotational speed, locking the output shaft to the engine shaft; and
increasing a rotational speed of the rotatable load beyond the given rotational speed.

2. The method of claim 1, wherein decelerating the one of the driven sun gear and the planet carrier includes exerting a force on the one of the driven sun gear and the planet carrier.

3. The method of claim 2, wherein exerting a force on the one of the driven sun gear and the planet carrier includes exerting a friction force on a surface of the one of the driven sun gear and the planet carrier.

4. The method of claim 1, wherein locking the output shaft to the engine shaft includes operating a mechanical lock from a first position in which the engine shaft is rotatable relative to the output shaft to a second position in which the engine shaft is rotatably locked to the output shaft, the engine shaft and the output shaft in joint rotation with each other in the second position of the mechanical lock.

5. The method of claim 4, wherein operating the mechanical lock includes moving a rod with an actuator engaged to the rod.

* * * * *